United States Patent
Barsness et al.

(10) Patent No.: US 10,547,578 B2
(45) Date of Patent: *Jan. 28, 2020

(54) MODIFICATION OF TEXTUAL MESSAGES

(71) Applicant: International Business Machines Corporation, Armonk, NY (US)

(72) Inventors: Eric L. Barsness, Pine Island, MN (US); Alexander Cook, London (GB); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,314

(22) Filed: May 14, 2019

(65) Prior Publication Data

US 2019/0273705 A1    Sep. 5, 2019

Related U.S. Application Data (63) Continuation of application No. 15/196,329, filed on Jun. 29, 2016, now Pat. No. 10,333,874.

(51) Int. Cl.
*H04L 12/58* (2006.01)
*G06F 17/27* (2006.01)
*H04W 4/14* (2009.01)
*H04L 29/06* (2006.01)
*H04L 29/08* (2006.01)

(52) U.S. Cl.
CPC ......... *H04L 51/063* (2013.01); *G06F 17/274* (2013.01); *H04L 51/04* (2013.01); *H04L 51/22* (2013.01); *H04L 51/26* (2013.01); *H04L 51/32* (2013.01); *H04L 51/36* (2013.01); *H04L 51/38* (2013.01); *H04L 63/102* (2013.01); *H04L 67/306* (2013.01); *H04W 4/14* (2013.01)

(58) Field of Classification Search
CPC ......... H04L 51/04; H04L 51/32; H04L 51/22; H04L 51/26; H04L 63/102; H04L 51/36; H04L 51/38; H04L 67/306
USPC .................................................. 709/201–206
See application file for complete search history.

(56) References Cited

U.S. PATENT DOCUMENTS

| | | | |
|---|---|---|---|
| 8,413,189 B1 | 4/2013 | Parekh et al. | |
| 9,172,671 B2 | 10/2015 | Bates et al. | |
| 9,501,744 B1 | 11/2016 | Brisebois et al. | |

(Continued)

FOREIGN PATENT DOCUMENTS

WO    2010062540 A1    6/2010

OTHER PUBLICATIONS

Barsness et al., "Modification of Textual Messages," U.S. Appl. No. 15/196,329, filed Jun. 29, 2016.

(Continued)

*Primary Examiner* — Chris Parry
*Assistant Examiner* — Weiwei Y Stiltner
(74) *Attorney, Agent, or Firm* — Peter J. Edwards (57) ABSTRACT

A writing style of content of a composed message, directed to a set of recipients, may be determined. A previous message that includes a first subset of recipients in the set of recipients may be analyzed. Writing habits of the first subset of recipients may be identified based on the analyzing. A difference between the writing style of the content and the writing habits of the first subset of recipients may be identified. The content of the composed message may be modified based on the difference.

10 Claims, 5 Drawing Sheets

(56) References Cited

U.S. PATENT DOCUMENTS

| | | |
|---|---|---|
| 2006/0167992 A1 | 7/2006 | Cheung et al. |
| 2008/0031251 A1 | 2/2008 | Rajan |
| 2010/0082751 A1 | 4/2010 | Meijer et al. |
| 2010/0223341 A1 | 9/2010 | Manolescu et al. |
| 2012/0136959 A1 | 5/2012 | Kadam et al. |
| 2012/0254333 A1 | 10/2012 | Chandramouli et al. |
| 2013/0191739 A1 | 7/2013 | Bank et al. |
| 2013/0253910 A1 | 9/2013 | Turner et al. |
| 2013/0007037 A1 | 10/2013 | Azzam et al. |
| 2014/0181221 A1 | 6/2014 | Kushtagi et al. |
| 2014/0201296 A1 | 7/2014 | Patfield et al. |
| 2015/0169546 A1 | 6/2015 | Davis et al. |
| 2015/0286619 A1 | 10/2015 | Chakra et al. |
| 2016/0191448 A1 | 6/2016 | Eck et al. |
| 2016/0342583 A1 | 11/2016 | Cunico et al. |
| 2017/0359277 A1 | 12/2017 | Snider et al. |
| 2018/0006979 A1 | 1/2018 | Barsness et al. |

OTHER PUBLICATIONS

List of IBM Patents or Patent Applications Treated as Related, Dated May 10, 2019, 2 pages.

MODIFICATION OF TEXTUAL MESSAGES

BACKGROUND

The present disclosure relates to natural language processing, and more specifically, to natural language processing and natural language generation of communications.

The use of text-based communication systems (e.g., email messages, SMS messages, and social-media messaging systems) in the day-to-day lives of the population is increasing. These messages are often used for communication in professional settings and in situations in which the sender of a message may be of a very different demographic than the recipient (e.g., located in a different geographic region, of a different cultural background, or of a different educational expertise). These different demographics may be manifested in corresponding different communication preferences and habits between the sender and recipient of a message. These different communication preferences may result in miscommunications between the sender and a recipient.

SUMMARY

Some embodiments of the present disclosure can be illustrated by a method of modifying the content of a composed message. A writing style of content of a composed message directed to a set of recipients may be determined using natural language processing. A previous message that includes a first subset of recipients in the set of recipients may be analyzed. Based on the analysis, writing habits of the first subset of recipients may be identified. A difference between the writing style of the content and the writing habits of the first subset of recipients may be identified. The content of the composed message to the first subset of recipients may be modified based on that difference.

Some embodiments of the disclosure can also be illustrated by a system comprising a processor and a memory in communication with the processor. The memory may contain program instructions that, when executed by the processor, are configured to cause the processor to perform a method for modifying the content of a composed message. In the method, a writing style of content of a composed message directed to a set of recipients may be determined. Demographic information of a first subset of recipients in the set of recipients may be analyzed. An indication of writing preference of the first subset of recipients may be identified based on the analysis. A difference between the writing style of the content and the indicated writing preference may be identified. The content of the composed message to the first subset of recipients may be modified based on the difference.

Some embodiments of the disclosure can also be illustrated by a computer program product comprising a computer readable storage medium having program instructions embodied therewith, the program instructions executable by a computer to cause the computer to modify the content of a composed message. The computer may determine a writing style of content of the composed message using natural language processing. The computer may analyze, using natural language processing, a response to a previous message written by the composer of the composed message. The computer may identify a responder's negative reaction to the previous message based on analyzing the response. The computer may then modify the content of the composed message based on the negative reaction.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing and natural language generation, more particular aspects relate to modifying message content in response to natural language processing. While the present disclosure is not necessarily limited to such applications, various aspects of the disclosure may be appreciated through a discussion of various examples using this context.

As the percentage of the population with constant access to internet-connected devices increases, text-based communication (e.g., email, short-message-service messaging, and instant messaging) becomes increasingly used over other forms of communication (e.g., voice communication over the phone). Natural language processing (NLP) may be used to analyze several metrics of these text-based communications. For example, NLP may be used to rate the grammar of a composed email (e.g., whether multiple grammar mistakes are present in the email), or to determine whether a text message is written in an angry tone (e.g., whether harsh or accusing words are used). Communication systems may also utilize natural language generation (NLG) to generate suggested alternative message content or automatically modify a message when NLP analysis identifies a potential issue with the message content (e.g., poor grammar).

The embodiments of the present disclosure may improve upon communication systems by, for example, enabling real-time analysis and modification of text-based message content and utilizing previously unused resources to identify when and which modifications may be beneficial. For example, the embodiments of the present disclosure may be performed by a stream-computing system that is configured to perform advanced NLP and NLG at the time a message is being sent. Such a stream-computing system may perform NLP and NLG fast enough to analyze and modify a message after a user has sent it without causing a noticeable delay in delivery time. Other embodiments of the present disclosure may make use of information stored in the communication system itself, such as language used in previous text messages or social media messages, geographic information in a recipient's email signature, and the nature of responses to messages previously sent by the message composer. This information may be useful when determining whether content in a message should be changed using NLG. In some embodiments this information may be reinforced or replaced by information derived from other sources, such as a recipient's demographic information retrieved from social media sites or other internet sources.

Figure 1:
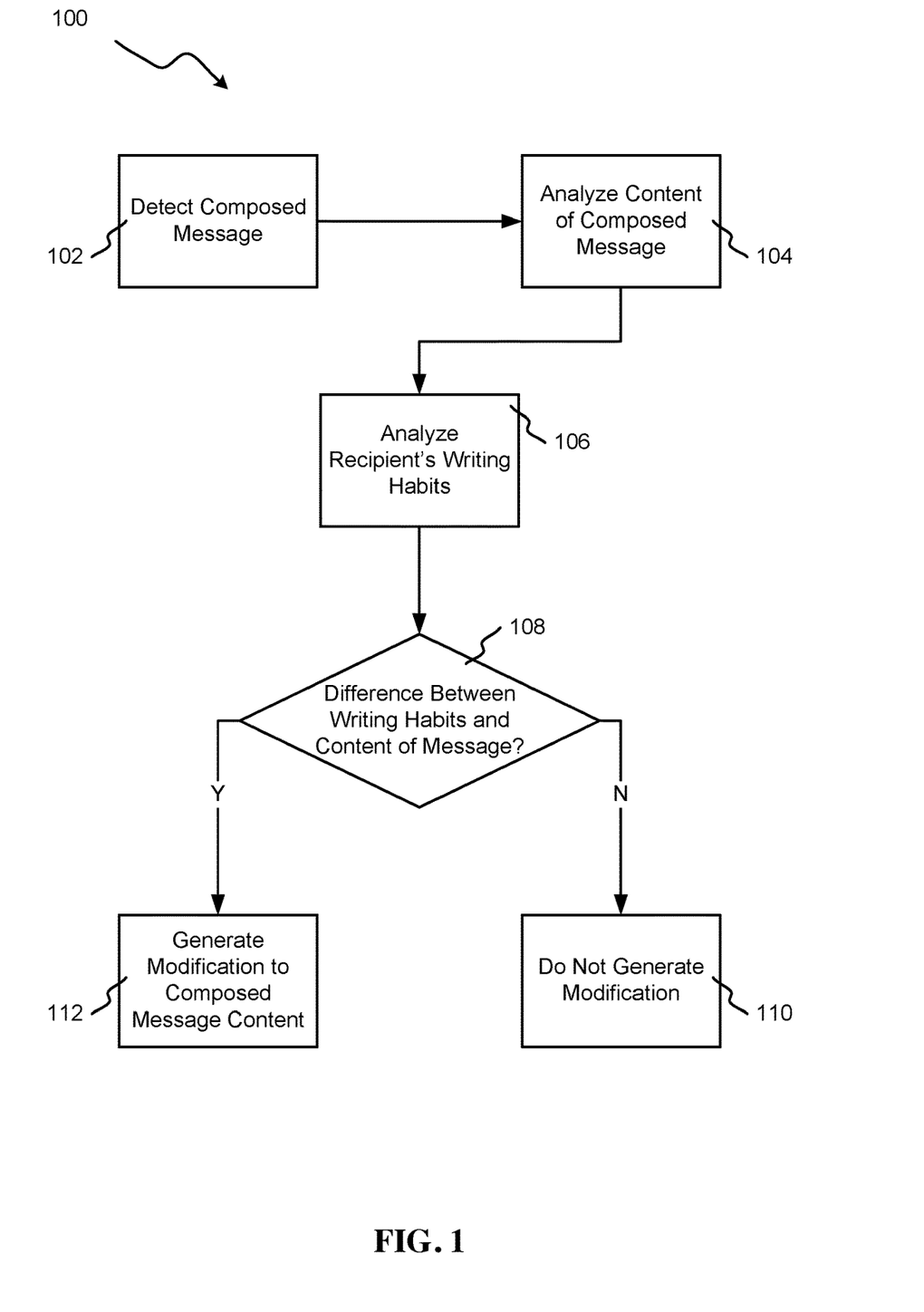
FIG. 1 depicts a method by which a message may be modified according to a recipient's writing habits, in accordance with embodiments.

FIG. 1 depicts a method 100 by which information in the communications system may be utilized to determine whether NLG modifications to a message would be beneficial. In block 102, a composed message is detected. In some embodiments this detection may occur while a composer is in the process of composing the message. In other embodiments the detection may occur once a message is saved (e.g., as a draft message). In other embodiments the detection may occur in response to a composer command (e.g., a composer may click a button in his or her email software requesting the software to perform NLP on the message). In yet other embodiments, the detection may occur once the composer has chosen to send the message. In such embodiments the detection may intercept the message to perform NLP before it is transmitted to the recipient.

Once the composed message is detected, the content of the composed message is analyzed using natural language processing in block 104. In some embodiments this may involve determining whether the composer used proper grammar throughout the message and calculating a "grammar score" for the content (e.g., an appraisal of the propriety of the grammar used in the content, the appraisal being in the form of a numerical rank such as 7/10 or 0.7, wherein 10 and 1 are considered "perfect" respectively). In other embodiments the natural language processing may analyze the word usage of the message and calculate a vocabulary level for the content (e.g., a qualitative or quantitative appraisal of the sophistication of the words used in the message, such as "below average," 7th-grade reading level, $75^{th}$ percentile, or 88/100). Some embodiments may detect regional or cultural slang. Other embodiments may determine a sentiment of the message (e.g., by detecting harsh or profane words, type of punctuation used, and the presence of "small talk" in an otherwise professional message). Yet other embodiments may determine a professionalism level of the content (e.g., detecting whether a standard greeting and a standard closing are used and detecting colloquial language). While in theory any type of natural language processing may be used, in some embodiments the relevance of information derived from natural language processing (e.g., grammar score, vocabulary level, message sentiment) may be determined by the information derived in block 106, discussed below.

In block 106 the writing habits of the recipients to whom the message is addressed are analyzed. In some embodiments a list of recipients may be readily available from metadata associated with the message (e.g., from the "To," "Cc," and "B cc" fields of an email message or the "To" field of a text message or social media message). In some embodiments previous messages sent (e.g., transmitted or posted) by these recipients may be available in the composer's text-based communication system for analysis. For example, the composer's email program may save or archive old messages received by the composer. Some of those messages may have been sent by one or more of the recipients, or may contain a conversation in which a recipient was otherwise involved (e.g., a message sent by a recipient to a third party may have been forwarded to the composer). In other embodiments the composer's SMS message history or social-media history may contain similar previous messages. In some embodiments a social-media message may be available that was not written to the composer. For example, the recipient may have publicly sent a message to another user or posted a status update that is publicly available. Any such social-media content may be analyzed as a message in block 106.

If a message written by a recipient is available, the content of that message may be analyzed using NLP to determine the writing habits of the recipient. Aspects of the recipient's previously sent message similar to those of the composer's message that were analyzed in block 104 may be analyzed here. For example, the grammar or professionalism level of the recipient's message may be calculated. A recipient's vocabulary level, vernacular (e.g., regional slang, common industry words, or personal word choice), and the sentiment of the recipient's message may also be determined.

Once the writing habits of the recipient are analyzed, they may be compared, in block 108, to the NLP results of the composer's message to determine if a significant difference exists between the writing style of the composed message (based on the analysis in block 104) and the writing habits of the recipient (based on the analysis in block 106). For example, if the composer's message is written with very poor grammar and the recipient typically uses impeccable grammar, it may be beneficial to correct some grammar mistakes of the composer's message. In some embodiments, this may include comparing grammar scores of the composed message content and the recipient's writing habits. In these embodiments, significant differences may exist if the difference between the grammar scores is above a predetermined threshold. Similarly, if the composer's message uses slang common in one region (e.g., city, state, or country) and the recipient typically uses regional slang common in another region, slang from the composer's region may be removed from the message and slang from the recipient's region may be inserted.

In some embodiments, regional-slang terms may be identified by cross referencing the terms used in the composed message to a database of textual sources (e.g., a corpus) with information on the geographic origin of each source. If a term used in the composed message is found predominantly only in textual sources from geographic regions in which the recipient does not live, that term may be considered regional slang. A natural-language-processing system (NLP system) may determine a list of substitute terms based on, for example, the dictionary definitions of the term, thesaurus data related to the term, semantic analysis of how the term is used in the composed message, a database of geographical terms/phrases, and others. One of those substitute terms may then be chosen based on the substitute term exhibiting a higher predominance of use in the recipient's region. In some embodiments the regional slang in the composed message may comprise multiple words strung together (i.e., a phrase). In these embodiments, the phrase may be identified by NLP analysis, such as examining the semantics, syntax, and definitions of the words used in the content.

In other examples, if the composer uses an abbreviation (e.g., an acronym) for a term that the recipient always writes out, the composer's message may be modified to write out the term. The composer may also use a layperson's equivalent of a different term that a person in the recipient's industry may use (e.g., the composer may use the term "video card" to refer to a graphics processing unit, which the recipient, a computer-hardware engineer, refers to only as "GPU"), in which case the composer's message may be modified to use the industry term.

If no significant difference is identified in block 108, no modification to the message would be generated (block 110). However, if a significant difference is identified, the modification to the composer's message content would be generated in block 112 using NLG. In some embodiments this modification may be presented to the user as a suggested modification (e.g., in the same user-interface field in which the composer is composing the message, or may be presented in a separate window). In some embodiments this suggestion may be presented during the composition (e.g., immediately after the to-be-modified content is typed), whereas in other embodiments the suggestion may occur after the composition is paused or finished (e.g., after the composer saves the message as a draft or instructs the communication-system software to run a "suggested-modification-detection process"). In other embodiments the user may be unprompted regarding, or may be otherwise unaware of, the modification generation; the content of the composer's message may be automatically modified, either as the composer is typing or after the composer has instructed the communication-system software to send the message.

In some embodiments, messages previously sent by a recipient may not be readily available, or may not provide sufficient message content by which to analyze the recipient's writing habits. In these embodiments other sources may be used to identify instances in which modification of content of a composed message would be beneficial. Examples of these embodiments are illustrated by method 200 in FIG. 2. In block 202 a send instruction for a composed message is detected. While in this embodiment the message is not detected until after the composer has instructed the communications system to send the message, in other embodiments it may be detected at other times, as discussed in relation to FIG. 1. In this embodiment the detection in block 202 may be accompanied by an interception in which the sending process is halted to enable method 200 to proceed. In other embodiments method 200 may proceed quickly enough for method 200 to be executed without causing a noticeable delay to the sending process (e.g., if executed by a streaming processor).

Figure 2:
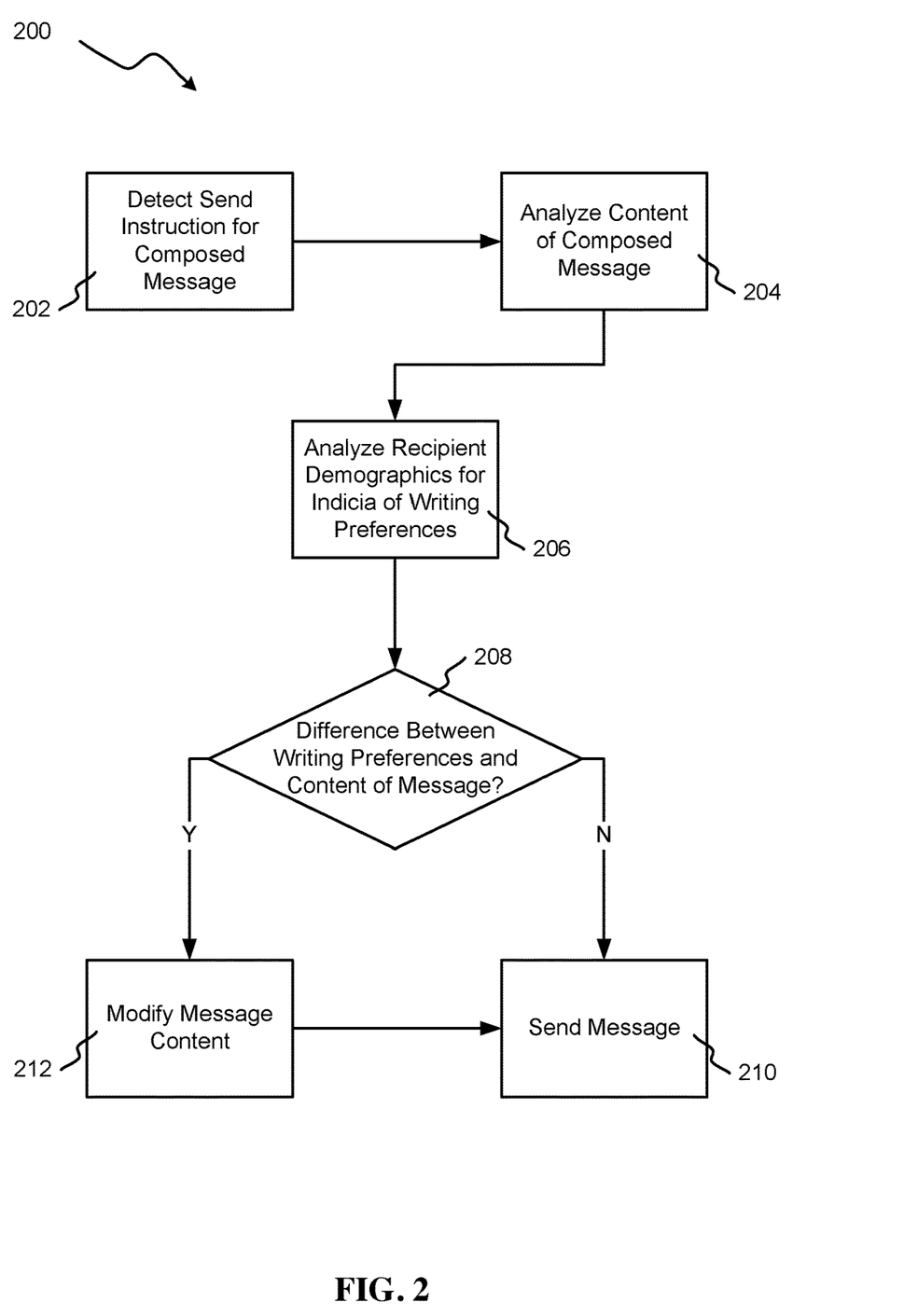
FIG. 2 depicts a method by which a message may be modified according to a recipient's demographics, in accordance with embodiments.

The content of the composed message is analyzed using natural language processing in block 204. The nature of the NLP analysis and the results of the analysis may be similar to those discussed in relation to block 104 of FIG. 1. In block 206, the recipient demographics are analyzed to identify an indication of the recipient's writing preferences. In some embodiments this analysis may be performed in addition to an NLP analysis of the content of one or more previous messages composed by the recipient (e.g., to increase the accuracy of the recipient-message content analysis). In other embodiments, this analysis may be performed in place of recipient-message content analysis (e.g., if a recipient message is unavailable).

In some embodiments the recipient's demographics may be accessible from the composer's communication system. For example, the composer's communication system may contain an address book that may provide information on the recipient, such as the recipient's business title, company name, address, or others. In other embodiments an address book may not be available but the communication system may contain an archived email chain that contains the recipient's email signature, from which similar demographic information may be available.

In other embodiments the recipient's demographics may be obtained by accessing the internet. If the recipient's name or email address is available, the name or email address could be searched online, such as on various social media sites. For example, the recipient may be connected with the composer on a social media platform, allowing access to the recipient's profile on that social media platform. In other embodiments, the recipient's profile may be publicly available, in full or limited form. The recipient's profile may provide demographic information such as age, gender, interests, geographic region, occupation, education, skills, and employment history.

In some embodiments an internet search may provide information on the recipient in addition to social-media content. For example, if the recipient's employer's name is ascertainable from the recipient's contact information (e.g., email address) the recipient's company website may be searched to determine the recipient's job title, whether the recipient is credited with multiple publications, the recipient's skills or experience, and others.

In some embodiments no social-media information pertaining to the recipient may be available, and an internet search may not be possible or may not provide information on the recipient. In some such situations situational demographic information may be available based on the address information of the recipient. For example, if the composed message is an email message and the recipient's email address appears to be a work address, it may suggest that the recipient would prefer a professional message as opposed to a casual message (e.g., written without contractions or colloquial language). However, if the email address appears to be a personal email address, it may suggest that the recipient would accept a less formal message (e.g., written with no salutation or closing). In some embodiments the system may determine whether an address is a professional email address or personal email address based on the domain part of the email address. In some embodiments the domain part of an email address may specify an entity that does not provide email service to non employees. For example, an email address of john.doe@uspto.gov probably is the professional email address of an employee of the United States Patent and Trademark Office (USPTO), because the USPTO does not provide email addresses to the public. In other embodiments the domain part of an email address may specify an entity that specializes in providing email services to private consumers. For example, an email address of jane.doe@hotmail.com is may be a personal email address because HOTMAIL is a domain name provided to many consumers by HOTMAIL and MICROSOFT for their personal email addresses. In some embodiments a phone-number address (e.g., when the composed message is an SMS message) may also be used to determine whether a message is being sent to a personal or professional address. For example, if an internet search of the area code and first three digits of a seven-digit telephone number provides many results of a very large company's telephone numbers, it may be that all 9,999 iterations of that area code and first three digits are owned by the very large company, and that the phone number is therefore a likely the professional number of one of that large company's employees. In some embodiments this address information may be used in addition to other information available.

Regardless of the source, these demographics are analyzed in block 206 to identify indicia that may have implications of the recipient's writing preferences. For example, identifying the recipient as the middle-aged CEO of a large company may imply that the recipient prefers a professional writing style. Identifying the recipient as a teenager, on the other hand, may imply that the recipient prefers a casual writing style. If the recipient is found to have been credited with many publications, the recipient may be likely to have a large vocabulary. If, on the other hand, the recipient has a coloring book listed as his or her favorite book in his or her social-media profile, the recipient may be likely to have a small vocabulary. If the recipient's social media profile has a Masters in English listed under the "education" section, the recipient may be likely to have an advanced understanding of grammar. If, on the other hand, the recipient's social media profile has "I dislike grammar" listed under the "interests" section, the recipient may be likely to have a poor understanding of grammar.

Upon identifying indicia of writing preferences in block 206, a determination is made in block 208 regarding whether there is a significant difference between the indicated writing preferences of the recipient and the content of the composed message. This difference may be present, for example, if the recipient demographics suggest that the recipient probably prefers professional writing and the composed message is written unprofessionally. A difference may also be present, for example, if the recipient and composer are located in two geographical regions that use a term in the composed message differently (e.g., "torch" as used in American English and British English).

If no difference is identified in block 208, the message is sent, as composed, in block 210. If, on the other hand, a difference is identified, the content is modified in block 212. For example, in the case that the recipient likely prefers professional writing and the content is written informally, a formal greeting and closing may be appended to the message content and contractions may be replaced with their spelled-out alternatives. If the recipient likely has an advanced understanding of grammar, the content may be modified to correct grammar mistakes using rules of grammar to which the natural-language-processing system may have access. If the recipient likely has a small vocabulary, esoteric words may be replaced with commonly known words with similar meanings. For example, the natural-language-processing system may have information related to the frequency of use of the words in a composed message. For example, the NLP system may have access to a collection of contemporary texts (e.g., a corpus), from which, in some embodiments, the frequency of use of any word used in the text may be calculated based on the number of uses in the collection. The NLP system may determine a frequency of use of each word used in the composed message. If the frequency of use of any word falls below a pre-determined threshold, the NLP system may determine a list of substitute words based on, for example, the dictionary definitions of the word, thesaurus data on the word, semantic analysis of how the word is used in the composed message, and others. The NLP system may then determine the frequency of use of each substitute, and replace the original word with a substitute with a higher frequency of use. In some embodiments the NLP system may have access to a database of infrequently used or esoteric words and commonly known replacements for those words. For example, the NLP system may scan the content of a composed message for any words present in an "esoteric words" table. If a word from the table is found, the system may then search a "substitute words" table for a set of substitute words. The system may choose a substitute based on, for example, a determination of which word may best fit in with the surrounding content of the message (e.g., by performing semantic analysis on the surrounding clauses, by matching the number of syllables in the substitute with the average number of syllables in the surrounding words), a determination of which word is most likely to be preferred by the recipient (e.g., by scanning the recipient's writing style to locate a substitute word used by the recipient), or by eliminating substitute words that are already present in the content of the composed message.

As a further example, if the recipient is located in a geographical region that uses a term differently than used in the message, the term may be replaced by a substitute that is used similarly in both regions. For example, each word in the composed message may be cross referenced against a corpus that has data on the geographic origins of the text sources in the corpus. Geographic thresholds similar to the previously discussed frequency-of-use thresholds may be utilized to identify words in the specification that occur predominantly only in geographic areas outside of which the recipient is located. Substitutes for those words may be determined. A substitute may be chosen, for example, based on geographic neutrality, high use in the recipient's geographic location, or high use in the recipient's and the composer's geographic locations. In some embodiments an NLP system may also have a database of words and phrases that are common only in certain geographical regions and substitutes of those words and phrases for other geographical regions.

Other modification processes are possible depending on the type of modification being generated. Once the content of the composed message is modified in block 212, the modified message may be sent to the recipient in block 210.

In some embodiments, no information on a recipient may be available. In these embodiments content of a composed message that could be modified may be identified based on other factors. For example, responses to previous messages sent by the composer may be used to clarify the composer's writing style. Such embodiments may be illustrated by method 300 in FIG. 3. A composed message is detected in block 302. In the illustrated embodiments this may occur after a user has entered a "send," or "analyze and send" instruction to the communications system. In other embodiments the detection may occur as the message is being composed, or when the message is saved as a draft.

Figure 3:
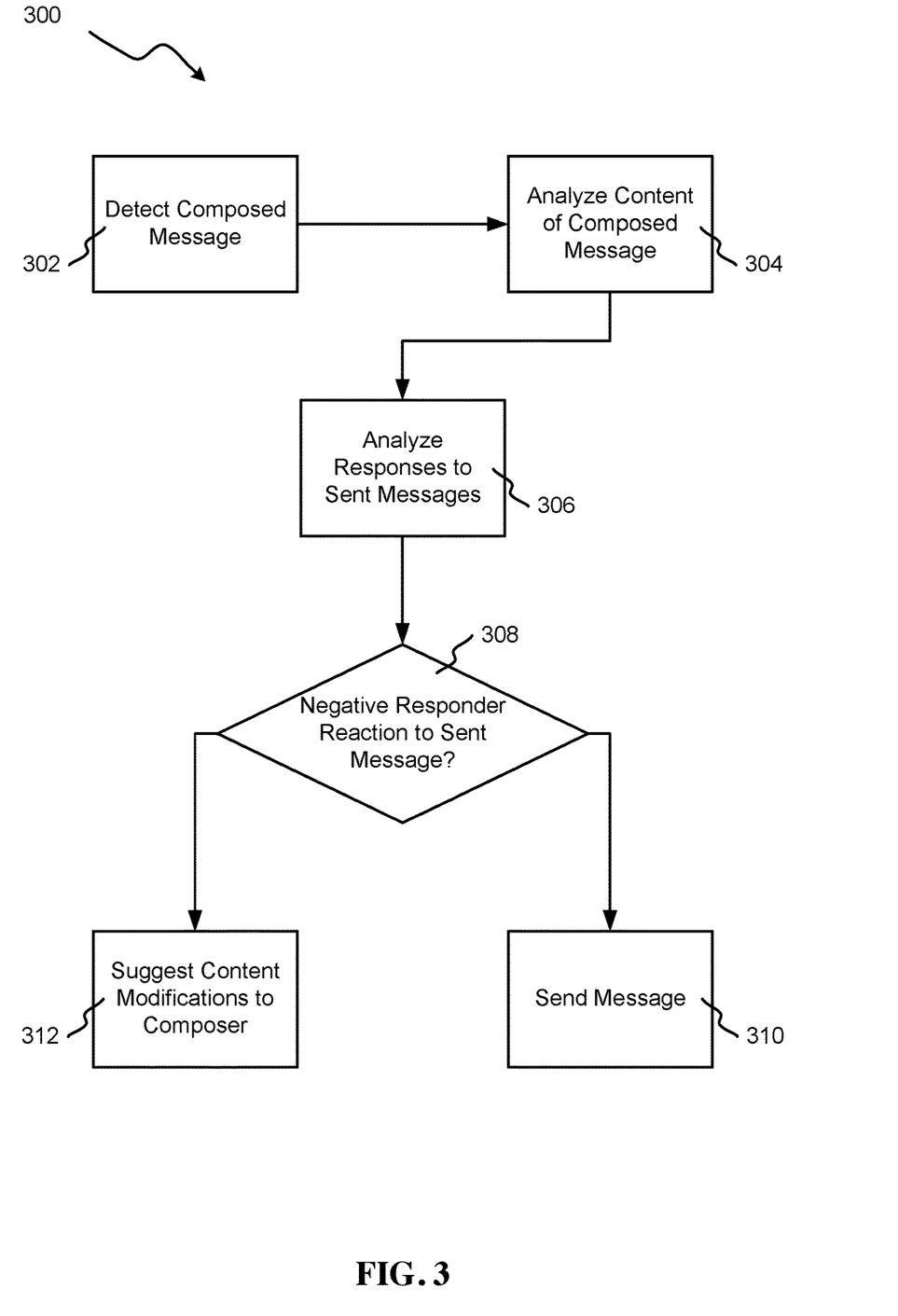
FIG. 3 depicts a method by which a message may be modified according to a past recipient's reaction to a composer's past message, in accordance with embodiments.

Once the composed message is detected, the content of the composed message is analyzed using natural language processing in block 304. The nature of the NLP analysis and the results of the analysis may be similar to those discussed in relation to block 104 of FIG. 1 and block 204 of FIG. 2. For example, the content of the composed message may be analyzed for potential lack of clarity (e.g., ambiguous statements or word choice, confusing sentence construction, or missing words). The content of the composed message may also be analyzed for sentiment, or other properties that may relate to how the content would be received by a general audience.

Responses to messages previously sent by the composer may be analyzed in block 306. These responses may be found, for example, in the inbox or archive of the composer's communication system or backup database. The responses may be analyzed using NLP for any indication of how the content of the original message was received by the responder (e.g., the responder's reaction to the original message). Negative responses may be identified based on, for example, sentiment analysis, parsing, semantic analysis, and logical analysis. In some instances the responses may indicate a negative reaction on the part of the responder. A negative reaction may be, for example, a lack of understanding (e.g., the responder did not think the original message was clearly written), offense (e.g., the responder may have considered the language or sentiment of the message to be unprofessional), annoyance (e.g., the responder may have commented that the message was needlessly long), or general negativity (the responder may have used harsh or otherwise negative language in his or her response, but natural language analysis may not be able to specify the negativity). For example, if an original message contains several questions, and the response or responses by one or more responders does not answer the question, but asks several questions related to the original-messages questions, the original message may not have been composed clearly. In some instances more information related to the original message's questions may have been necessary, whereas in other instances the original message's content may have been poorly written (e.g., improper grammar or ambiguous wording). In some embodiments the analysis may detect that the responders were offended or annoyed by the content of the original message. In some such instances the original message may have contained unprofessional language, may have been accusatory, or may have been unnecessarily long. As these examples show, a negative response and the cause of that response may be determined by a mixture of NLP analysis of the original message and the response to that message.

After analyzing responses to previously sent messages, a determination is made in block 308 regarding whether a negative response to the original message is identified. For example, if previous responses suggest that the original message was unclear due to word choice, it may imply that the composed message may also be unclear. If previous responses imply that recipients often find the writer to be harsh, it may imply that the composed message may also be harsh. Thus, these negative responses may highlight a benefit in modifying the content of the composed message accordingly (e.g., by replacing the unclear wording with more specific wording or softening the sentiment of the message).

In some embodiments the responses to multiple available previously sent messages may be analyzed in block 306 to develop a long-term writing history of the composer. This long-term writing history may exhibit trends. For example, the long-term writing history may illustrate that the composer used to write very confusing messages, but that no unclear messages had been sent over the past several years (e.g., if the composer took a writing class). Or, the long-term writing history may imply that the composer's messages have had a very positive sentiment up until the last several days, at which point the composer's messages may have developed a very angry sentiment (e.g., if the composer is frustrated by recent events). These trends may be used when determining content of the composed message may cause a negative reaction on the part of the recipient. For example, if the long-term history illustrates that the composer's messages are getting less confusing over time, a composed message may be less likely to cause confusion in the recipient. However, if the messages are very harsh recently, a composed message may be more likely to offend a recipient.

If no negative responder reaction is identified in block 308, the message may be sent in block 310. However, if negative responder reaction is identified, modifications may be generated and suggested to the composer in block 312. In some embodiments block 308 may include a threshold of negative responder reactions. This threshold may be determined by the composer's communication-system settings. For example, responses to the composer's previous messages may be analyzed as a group to determine the percentage of responses that exhibited a certain negative reaction (e.g., confusion). If the threshold for responder confusion is set to 40%, and only 35% of the responses analyzed exhibited responder confusion, block 308 may determine that insufficient negative responder reaction was identified, and proceed to block 310. However, if 42% of the responses analyzed exhibited responder confusion, block 308 may determine that sufficient negative responder reaction was identified, and proceed to block 312. In some embodiments a single threshold may be set for all types of negative responses, whereas in other embodiments separate thresholds may be set for each type of negative response.

The responses analyzed may be chosen based on a time limit (e.g., all responses to previous messages sent by the composer in the past week or year), recipient criteria (e.g., all responses to previous messages sent by the composer to responders who work for the same company as the recipient), or others (e.g., all responses to previous messages sent by the composer on Monday morning).

If sufficient negative responder reactions are identified, a modification is generated in block 312. The type of modification that is generated may vary based on the negative response identified. For example, if a response suggests that the responder found an original message to be too long, semantic and syntactic analysis may be performed on the composed message content to identify repeated statements or ideas for removal. If a responder found an original message to be too harsh, the definitions of words used in the composed message content may be searched and substitutes identified for words with negative connotations. If the composers message history suggests that responders find his or her messages to be devoid of report-building language, the composed-message content may be modified to include small talk (e.g., a comment about the weather or a "how are you" question).

In some embodiments the suggestion may call attention to the writing history that implied the motivation to modify the content. In other embodiments no modification may be generated, but a concern based on the writing history may be presented to the composer. In some embodiments method 300 may be performed while a message is still being composed, in which case the suggestion may be displayed to a composer as the composer is typing the message. In other embodiments method 300 may be performed after a user has finished composing a message, in which case the suggested modification may be presented to the user, for example, as a final check before the message is sent by the communication system.

Many embodiments discussed herein refer to a composed message as addressed to a single recipient. However, the embodiments of this disclosure may also be applied to messages addressed to multiple recipients. For example, in some embodiments a composed message may be addressed to a set of recipients, and an average writing habit or demographic for all recipients in the set may be calculated and used to determine whether a modification to the message content is necessary. The same modification may then be applied to all copies of the composed message when the composed message is sent to the recipients. In other embodiments, separate writing habits or preferences may be determined for each potential recipient, and in turn a separate modification to each recipient's copy of the message may be made. In some embodiments recipients for whom no little or no writing-habit or -preference information is available may be included in the address list of a message with recipients for whom a significant amount of writing-habit or -preference information is available. In those embodiments the recipients for whom no information is available may be sent a copy of the composed message as individually written, while other recipients may be sent a modified message.

In some embodiments it may be beneficial to arrange recipients into groups. This may help to customize a message for each recipient. For example, a composer may address an email to ten recipients. Two of those recipients may be peers of the composer at the composer's employer, and may be sent a first modified copy of the message (e.g., a less formal copy). The remaining eight recipients may all be employed by the composer's client, in which case they may be sent a second modified copy of the message (e.g., a more professionally written copy). However, within the group of eight recipients, further tuning according to recipient information may be possible. For example, if one of the eight recipients is the composer's regular contact at the client company, the composer may have a report with that contact, and may wish to send a less-formal (i.e., less professional) message to that contact. The copy of the message modified for the group of eight may then be further modified to be less formal before being sent to that contact. In some embodiments this may be performed by undoing some modifications that were performed for the entire group. In other embodiments this may involve an analysis of the writing habits of the contact and generation of a modification to correspond to those writing habits. However, the CEO of the client company may also be one of the eight recipients, and the composer may wish to send a particularly formal message to the CEO. The copy of the message modified for the group of eight may then be further modified to be even more formal (i.e., more professional) before being sent to the CEO. This would result in three different messages sent to the group of eight recipients at the client company, each message differing in the level of professionality.

In some embodiments a composer may have the ability to limit the type of modifications or magnitude of modifications that are suggested or performed on the composer's messages. For example, the composer may allow for his or her grammar and spelling to be corrected, but only in so far as the total email changes twenty percent or less. A composer may also allow for his or her grammar to be corrected or "dumbed down" if those changes amount to a forty percent or smaller change in the message overall, and may allow unlimited modifications to address professionalism and sentiment issues, but may not allow any modifications to address cultural-sensitivity or political-correctness issues. A composer may require some types or amounts of modifications to be reported to the composer before a message is modified or sent. In some embodiments, a composer may place no restrictions on modifying a message or sending after the message is modified.

In some embodiments the NLP analysis of composed message and the analysis of recipient information can be used to track whether responses to questions in the composed message have been answered after the composed message has been sent. Such an embodiments is illustrated by method 400 in FIG. 4. In block 402 a composed message is detected. In block 404 NLP analysis is performed on that composed message to identify questions in the message that are directed to the recipients. The composed message is sent to the recipients in block 406. After the message has been sent, the communications system waits a pre-determined period of time. This wait time may be determined, for example, by performing NLP analysis on the content of the composed message and identifying a requested response date or time (e.g., a reply-by date in the message or a statement suggesting that the composer requires the answer to a question in a period of time). In these embodiments, the wait time expires upon that response date or time. The wait time may also be determined, for example by the preferences of the composer's communication system (e.g., a setting specifying the wait time for all questions for which NLP analysis cannot determine a wait time, or a setting specifying a wait time that is, for example, one day shorter than a reply-by date in the composed message).

Figure 4:
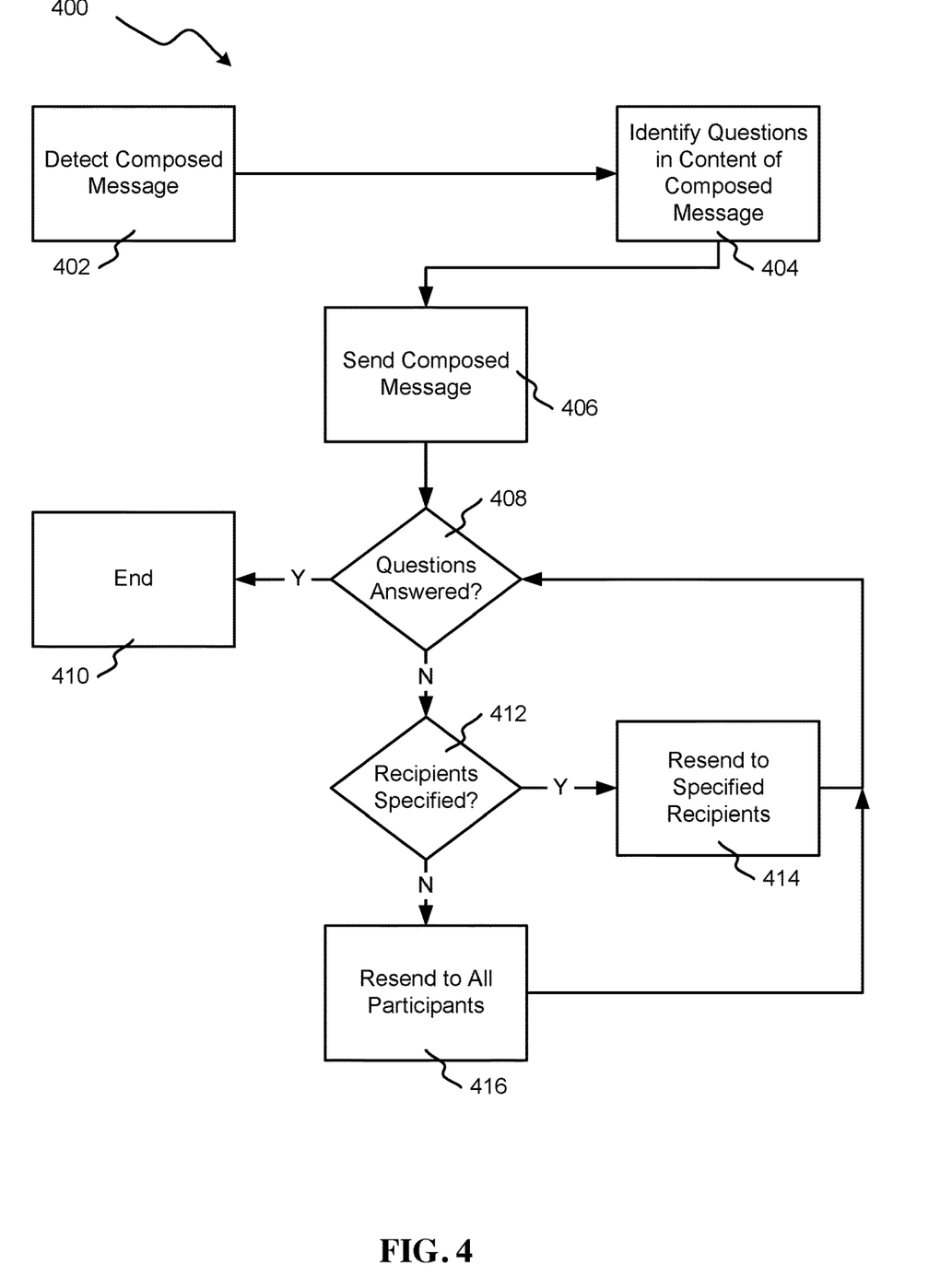
FIG. 4 depicts a method by which a message may be retransmitted to a recipient based on the recipient's failure to answer a question in the message, in accordance with embodiments.

Upon the expiration of the wait time, a determination is made in block 408 whether the identified questions have been answered. For example, response messages sent by recipients to the composer may be reviewed. Terms in the identified questions may be matched with terms in the response messages to identify message content that may be addressed to the identified question. This matching may be by identifying identical terms, or by searching the content of a response message for phrases or terms that correspond to dictionary or thesaurus data of terms used in the identified questions, or vice versa. Natural language processing may also be performed on phrases in the identified questions and the response messages to determine if similar content is being discussed.

If the questions have been answered, method 400 ends at block 410. If the questions have not been answered, a determination is made in block 412 of whether the questions were addressed to specific recipients. In some embodiments this may involve an NLP analysis of the question and surrounding text to determine if a recipient's name is involved with the question. For example, a recipient's name and a colon, hyphen, or comma may directly proceed the question. The question may also be followed by a sentence asking one of the recipients to respond by a certain time. If the questions are numbered, the message may include a statement assigning each number to a name or assigning a name to a set of numbers. Relatedly, the questions may be broken into topics, or embedded into paragraphs that are delineated by topic headers, and each recipient may be assigned a topic. If the questions are embedded into paragraphs, each recipient may be directed to a paragraph by number (e.g., "the fourth paragraph" or "the last paragraph") or other method (e.g., if the composed message directs a participant to handle "the catering issues," the questions in the paragraph that refers to "catering," "caterers," "food," "dinner," or others may be directed to that participant). If it appears that the questions are directed to a participant, the message is retransmitted to only those specified recipients in block 414. If it does not, the message is retransmitted to all participants in block 416. In some embodiments, the same message that was sent in block 406 may be retransmitted in either block 414 or block 416. However, in other embodiments natural language generation may be used, along with information collected on the recipients by, for example, the methods discussed in connection with FIGS. 1 & 2, to generate a reminder message. This reminder message may be tailored specifically to the recipient's writing habits and indicated preferences. The reminder message may be automatically sent, or displayed to the original composer for approval.

In this embodiment, a second wait time begins after the message is retransmitted to the participants in either block 414 or 416. At the conclusion of the second wait time, method 400 returns to block 408, at which point a determination of whether the questions have been answered is made again. This cycle may repeat until all questions are answered, or may end at block 410 after a determined amount of repetitions (e.g., according to a setting in the composer's communication system or when the composer manually halts the process). In some embodiments this second wait time may be equal to the first wait time. In other embodiments the second wait time may be longer or shorter, and may be determined, for example, based on the preferences of the composer's communication system. In other embodiments, no second wait time may occur, and method 400 may end at block 410 after the message is retransmitted in block 414 or 416.

Figure 5:
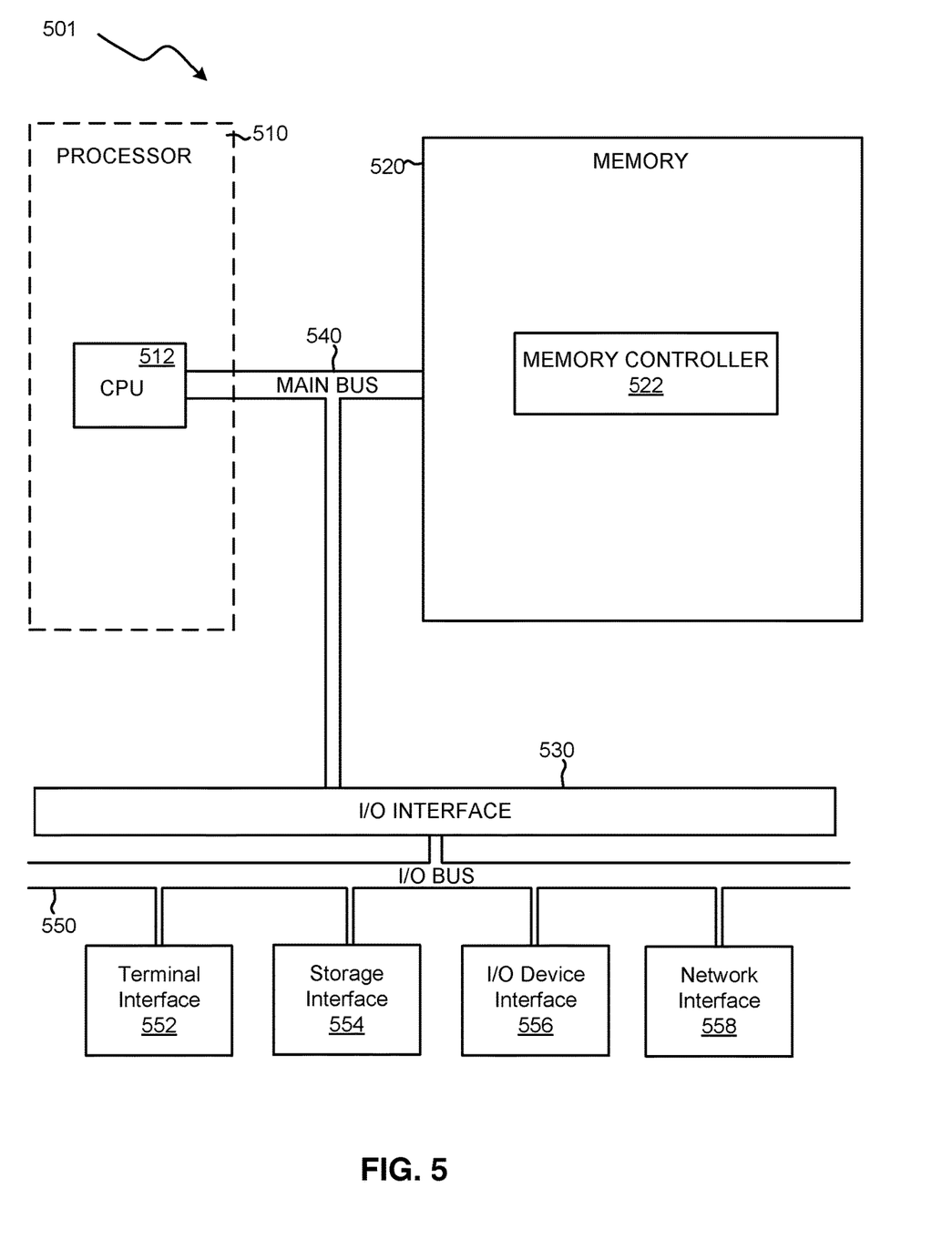
FIG. 5 depicts the representative major components of a computer system that may be used in accordance with embodiments.

FIG. 5 depicts the representative major components of an exemplary Computer System 501 that may be used in accordance with embodiments of the present disclosure. The particular components depicted are presented for the purpose of example only and are not necessarily the only such variations. The Computer System 501 may comprise a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may be comprised of one or more CPUs 512. The Processor 510 may additionally be comprised of one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may be comprised of one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may be comprised of a Memory Controller 522 and one or more memory modules for temporarily or permanently storing data (not depicted). In some embodiments, the Memory 520 may comprise a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may comprise an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may comprise the Terminal Interface 552, the Storage Interface 554, the I/O Device Interface 556, and the Network Interface 558. In some embodiments, the various interfaces may comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   determining, using natural language processing, a writing style of content of a composed message written by a composer;
   analyzing, using natural language processing, a set of responses to a set of previous messages, wherein the previous messages in the set of previous messages were sent by the composer and the response was written by a responder;
   identifying, based on the analyzing the response, a set of reactions to the previous messages;
   developing, based on the set of reactions, a long-term writing history of the composer, wherein the long-term writing history implies that the composer's messages have developed an angry sentiment recently;
   concluding, based on the long-term writing history, that the composed message is likely to have an angry sentiment; and
   modifying, based on the concluding, the content of the composed message.

2. The method of claim 1, wherein the modifying is limited by the composer.

3. The method of claim 2, wherein the limit places restrictions on the amount to which a type of modification may change the message.

4. The method of claim 1, further comprising displaying, to the composer, a generated modification before the modifying.

5. The method of claim 1, wherein the modifying occurs before composer attempts to send the composed message to the set of recipients.

6. A system comprising:
   a processor; and
   a memory in communication with the processor, the memory containing program instructions that, when executed by the processor, are configured to cause the processor to perform a method, the method comprising:

determining, using natural language processing, a writing style of content of a composed message written by a composer;

analyzing, using natural language processing, a set of responses to a set of previous messages, wherein the previous messages in the set of previous messages were sent by the composer and the response was written by a responder;

identifying, based on the analyzing the response, a set of reactions to the previous messages;

developing, based on the set of reactions, a long-term writing history of the composer, wherein the long-term writing history implies that the composer's messages have developed an angry sentiment recently;

concluding, based on the long-term writing history, that the composed message is likely to have an angry sentiment; and modifying, based on the concluding, the content of the composed message.

7. The system of claim 6, wherein the modifying is limited by the composer.

8. The system of claim 7, wherein the limit places restrictions on the amount to which a type of modification may change the message.

9. The system of claim 6, wherein the method further comprises displaying, to the composer, a generated modification before the modifying.

10. The system of claim 6, wherein the modifying occurs before composer attempts to send the composed message to the set of recipients.

* * * * *